June 16, 1953     A. RAPPL     2,641,789
ARTICULATED WIPER BLADE
Filed Dec. 20, 1946
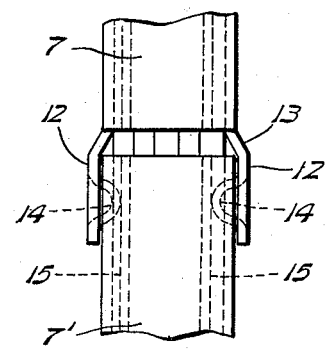
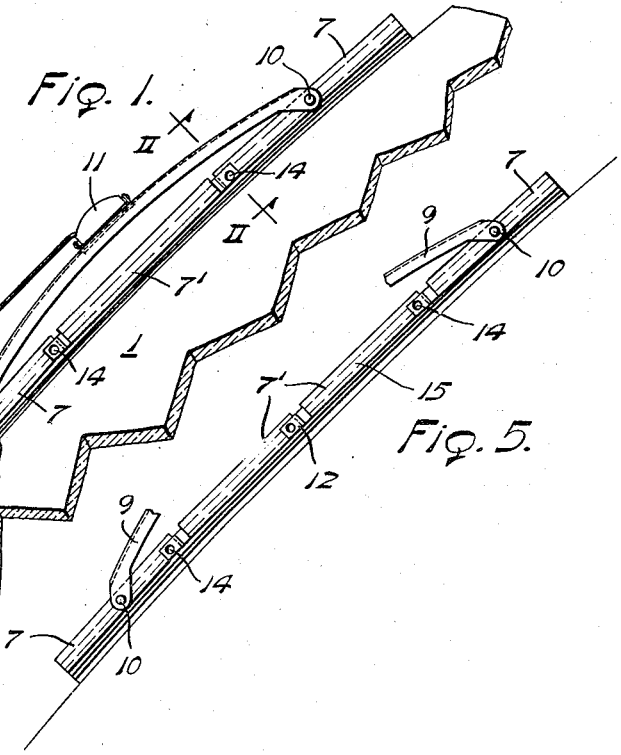
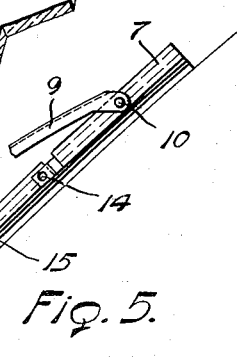
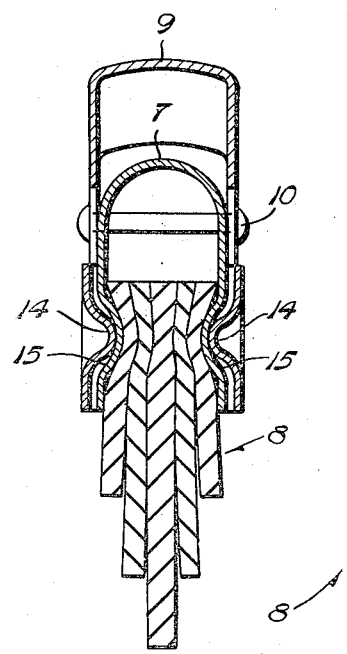
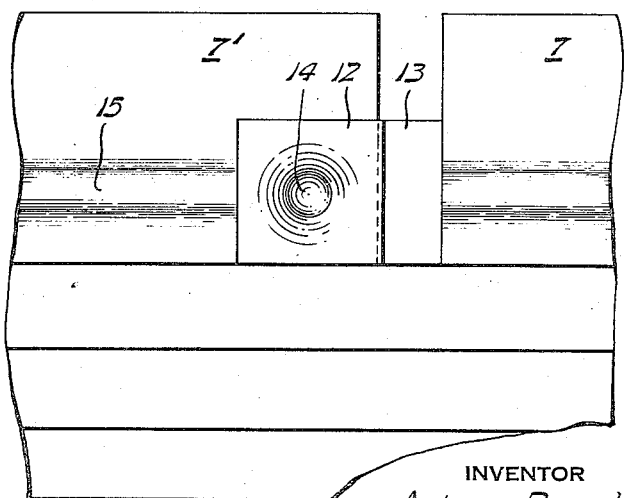
INVENTOR
*Anton Rappl*
BY
*Bean, Brooks, Buckley + Bean*
ATTORNEY Patented June 16, 1953

2,641,789

UNITED STATES PATENT OFFICE 2,641,789

ARTICULATED WIPER BLADE

Anton Rappl, Eggertsville, N. Y., assignor to Trico Products Corporation, Buffalo, N. Y.

Application December 20, 1946, Serial No. 717,543

8 Claims. (Cl. 15—245)

This invention relates to the windshield cleaning art and has particular reference to a wiper for curved windshield surfaces.

It has heretofore been proposed to provide a cleaner for curved windshields in which the rubber wiping element was given support along its back edge with a series of rigid backing elements, such as by the channeled holders employed in the manufacture of the well-known straight edge wiping blade. In such prior construction the adjacent ends of the backing elements were free to move relative to each other and therefore were likely to become relatively offset with the result that the wiping edge of the squeegee element would become distorted, or possibly buckle, in a manner to leave streaks across the field of vision with a resultant impairment of vision therethrough.

The object of the present invention is to provide a blade of this character in which the wiping edge is maintained in proper and full contact with the surface being acted upon for a more efficient functioning.

Again, the invention has for its object to provide a curved windshield wiper in which the backing structure is of articulated design to give a definite or controlled flexibility to the blade for better conformance of the wiping edge to changes in the surface contour of the windshield as the wiper is moved thereacross.

The foregoing and other objects will manifest themselves as the following description progresses, wherein reference is made to the accompanying drawing in which:

Fig. 1 is a side elevation of a wiper blade embodying the present invention, the blade being shown in its operative position upon a fragmentary portion of the windshield;

Fig. 2 is a transverse section taken about on line II—II of Fig. 1;

Fig. 3 is an enlarged fragmentary view of a wiper in side elevation;

Fig. 4 is an enlarged fragmentary view of a modified wiper in plan; and

Fig. 5 is a fragmentary showing of the modified form of wiper.

Referring more particularly to the drawing, the numeral 1 designates the windshield of a motor vehicle at the lower side of which is journaled a shaft 2 for actuating a wiper carrying arm. The arm has a mounting section 3 and an outer wiper carrying section 4 which is pivotally joined to the mounting section 3 by pivot 5 and is urged at its outer end toward the windshield 1 by means of a spring leaf 6.

The wiper itself comprises a plurality of relatively movable channeled holders 7 and 7' arranged in a longitudinal series over the back of the unitary rubbery wiping body 8. The wiping body may be molded, or it may be composed of a plurality of rubber plies arranged in stepped order, as illustrated in Fig. 2. The channeled holders are clamped over the back margin of the body thereby leaving the opposite margin to serve as a wiping edge. A bridge member 9 has its opposite ends connected to the blade reinforcement 7 by pivots 10 which latter extend transversely of the body in order that the end holders may individually pivot thereon. This leaves the intermediate holder or holders 7', where more than two are utilized, suspended between the end holders by the resilient wiping body which extends continuously through the several channels. An attaching device 11 provides a means of connection between the outer end of the wiper carrying arm and the bridge member 9.

In accordance with the present invention, means are provided to give guiding support to the adjacent ends of the holders against torsional and lateral stresses. Such supporting means are herein shown as longitudinal extensions from the opposed side walls of the channeled holders and are designed to straddle and overlap the side walls of the adjacent channeled member. The straddling arrangement may be facilitated by offsetting the extensions or ears 12 outwardly, as shown at 13 in Fig. 4. This provides a construction in which the adjacent ends of adjoining holders are given lateral support against relative sidewise displacement as well as resistance against torsional strains.

The guiding and supporting ears 12 may ride freely over the side faces of the straddled holder, or they may be confined against such relative movement by providing the ears with trunnion-like projections 14 to engage in the longitudinally extending side grooves 15 of the holders, such grooves resulting from the formation of the internal ribs on the side walls of the channel which serve to clamp the wiper body in place. The trunnion-like projections 14 are herein illustrated as being pressed inwardly from the ears to nest freely within the grooves 15 for sliding as well as pivotal movement. The ears 12 may be formed on both ends of an intermediate channel holder, as shown in Fig. 1, or they may be shown on corresponding ends of a series of successive channel holders, as shown in Fig. 5, wherein the end holder is devoid of any ears whatsoever; thus indicating that the ears may be arranged as desired to accomplish the intended functional operation.

This construction provides a simple interlock between the adjacent sections and imparts a flexibility to the blade backing in which the channeled holders constitute chain links. The trunnion and groove interlock is the equivalent of the chain-link connecting pin playing loosely in elongated holes or slots. Therefore, each link embraces the back edge of the wiping body and is free, to a limited extent, to telescope as well as to move from the companion link as the rubber contracts and stretches.

For example, when the wiping edge passes onto a surface of less radius, thereby giving a sharper curve, the back margin will elongate as the trunnions slide in the grooves 15. A reverse action will follow when the wiper passes onto a curved surface of increased radius.

Furthermore, it will be noted that the wiping edge will be acting in tension between the spaced suspension points 10 on the bridge 9. Consequently, the suspended intermediate links 7' will be retained operatively related to the end links 7 by reason of the guiding support of the ears. Thus, the single wiping edge is given practical support against buckling between the links of the articulated backing. The reinforcing links are held against lateral and vertical movement relative to each other.

The foregoing description has been given in detail for ease of understanding and not by way of limitation since the inventive principles involved are capable of assuming other physical embodiments without departing from the inventive teaching as expressed in the appended claims. Obviously, the holders could be simple links embedded in the rubber body and telescopically connected one to the other in an equivalent manner.

What is claimed is:

1. A wiper comprising a flexible body having a wiping edge along one margin, a series of elongate backing members arranged end to end along the opposite margin of the body for reinforcing the same, and an arched supporting bridge pivotally connected at its opposite ends to points on the end members intermediate their ends for enabling the end members to rock toward and from the windshield surface, there being a backing member intermediate the end members which is suspended by the body free of the bridge and which gives support to the body portion between such end members.

2. A wiper comprising a flexible body having a wiping edge along one margin, a series of links arranged end to end along the opposite margin of the body for reinforcing the same, an arched supporting bridge pivotally connected at its opposite ends to points on the end links intermediate their ends for enabling the end links to swing toward and from the windshield surface, there being a link intermediate the end links which is suspended by the flexible body free of the bridge and gives support to the body portion between such end links, and supporting means flexibly connecting the adjacent ends of the two end and intermediate links together.

3. A wiper comprising a flexible body having a wiping edge along one margin, a series of links arranged end to end along the opposite margin of the body for reinforcing the same, an arched supporting bridge pivotally connected at its opposite ends to points on the end links intermediate their ends for enabling the end links to swing toward and from the windshield surface, there being a link intermediate the end links which is suspended by the body free of the bridge and which gives support to the body portion between such end links, each link having a channel embracing said opposite margin, and supporting means flexibly connecting the adjacent ends of the links together at both channel sides.

4. A wiper comprising a flexible body having a wiping edge along one margin, a series of links arranged end to end along the opposite margin of the body for reinforcing the same, and an arched supporting bridge pivotally connected at its opposite ends to points on the end links intermediate their ends for enabling the end links to swing toward and from the windshield surface, there being a link intermediate the end links which is suspended by the body free of the bridge and which gives support to the body portion between such end links, each link being of channeled form with the side walls of the channel having longitudinal grooves therein, certain side walls having end extensions receiving the adjacent end of an adjoining link, with projections pressed from the straddling extensions into the grooves for sliding and pivoting movement.

5. A wiper comprising a flexible body having a wiping edge along one margin, a metal backing along the opposite margin of the body for reinforcing the same and including longitudinally spaced elongate members extending lengthwise of the body, an arched supporting bridge pivotally connected at its opposite ends to points on the elongate members intermediate their ends for affording pivotal movement of the members in conforming the opposite end portions of the body to the windshield surface, there being a portion of the metal backing intermediate the adjacent ends of the elongate members having direct telescoping contact with such adjacent ends to support said intermediate portion in suspension and normally free of the bridge to give support to the body portion between such elongate members, and means by which the bridge may be attached to an actuating arm.

6. A wiper for curved surfaces, comprising a flexible body having a wiping edge along one margin, a supporting bridge having means intermediate its ends for attaching an actuating arm thereto, longitudinally spaced pressure distributing members extending lengthwise of the body and movably connected to the opposite ends of the bridge for rocking relative to the latter in conforming the opposite end portions of the body to the windshield surface, backing means held in suspension by the inner adjacent ends of said pressure distributing members for giving support to the flexible body portion intermediate said inner ends, and means formed on said inner adjacent ends of said pressure distributing members contacting said backing means and having direct sliding connection therewith.

7. A wiper for cleaning a curved surface, comprising an elongated blade flexible for conforming to the surface curvature, a bridge member extending lengthwise of the blade and having an arm attaching portion, longitudinally spaced backing members giving support to the blade and each being connected intermediate its ends to an end of the bridge member for rocking thereon to conform the adjacent end portion of the blade to the surface, and means positioned between said backing members contacting each of the same and having direct sliding flexible connection therewith to provide one continuous flexible support for the flexible blade from one end to the other end of the bridge member, the inner ends of said backing members being spaced from each other a distance substantially equal to the length of either backing member.

8. A wiper comprising a flexible elongate body having a wiping edge along one margin, a pair of elongate channeled backing members arranged in spaced relation along the opposite margin of the body for supporting the same, an arched supporting bridge pivotally connected at its opposite ends to points on the backing members intermediate their ends for surface conforming adjustment about transverse axes, and a third channeled member interposed between and having its opposite ends pivotally interlocking with the inner ends of the pair of channeled members for surface conformance, said third channel embracing the body and giving intermediate support to the medial body portion independently of the bridge.

ANTON RAPPL.

References Cited in the file of this patent

UNITED STATES PATENTS

| Number | Name | Date |
|---|---|---|
| 1,694,245 | Baker | Dec. 4, 1928 |
| 1,913,248 | Scott | June 6, 1933 |
| 2,149,037 | Zaiger | Feb. 28, 1939 |
| 2,303,694 | Horton | Dec. 1, 1942 |

FOREIGN PATENTS

| Number | Country | Date |
|---|---|---|
| 345,867 | Canada | Nov. 6, 1934 |
| 427,383 | Great Britain | Apr. 23, 1935 |
| 820,156 | France | July 26, 1937 |